E. Q. MOSES.
VEHICLE CONSTRUCTION.
APPLICATION FILED JUNE 9, 1919.

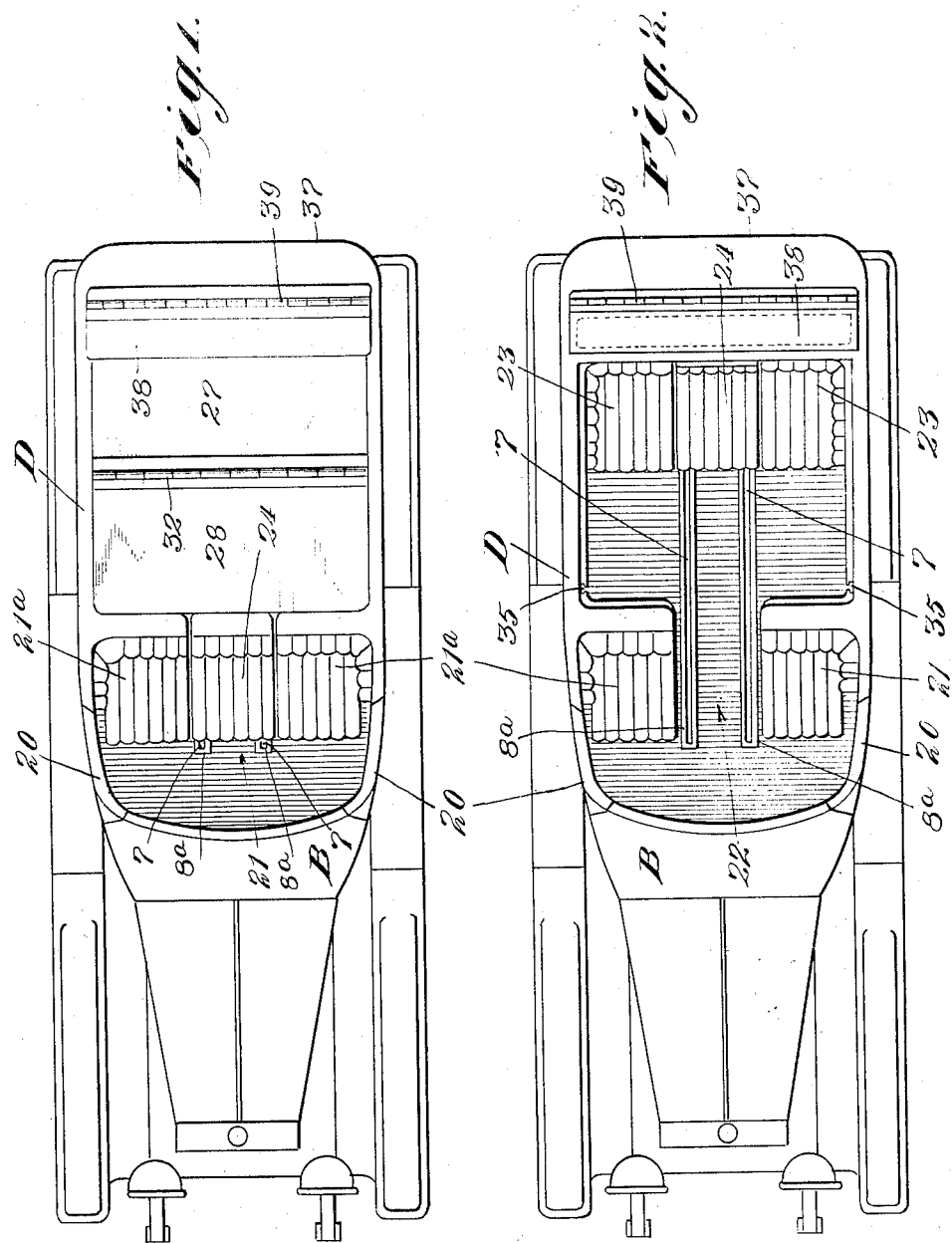

1,397,594.

Patented Nov. 22, 1921.

INVENTOR

UNITED STATES PATENT OFFICE.

EDMUND QUINCY MOSES, OF NEW YORK, N. Y., ASSIGNOR OF ONE-HALF TO WILLIAM P. HAMMOND, OF PASSAIC, NEW JERSEY.

VEHICLE CONSTRUCTION.

1,397,594.   Specification of Letters Patent.   Patented Nov. 22, 1921.

Original application filed October 25, 1917, Serial No. 198,377. Divided and this application filed June 9, 1919. Serial No. 302,686.

*To all whom it may concern:*

Be it known that I, EDMUND QUINCY MOSES, a citizen of the United States, residing in New York, county of New York, and State of New York, have invented new and useful Improvements in Vehicle Construction, of which the following is a specification.

This invention relates to improvements in vehicle construction, which are especially applicable to automobiles. The primary object of the invention is to provide an improved construction whereby the vehicle body may be made convertible so as to provide convenient accommodation for a smaller or a larger number of passengers. Many persons do not like to drive or ride in a large car when there are only one or two passengers besides the driver, and for this reason prefer roadsters or coupes, but such cars have the drawback that the accommodations are limited and more passengers cannot be conveniently carried. The present invention provides for a body construction having the advantages of a roadster and which may also be rearranged so as to provide accommodations for additional passengers. The improvements relate more specifically to an improved top construction adapted to be utilized with either arrangement of the vehicle seats and also to improvements in the seating arrangement especially adapted to the purposes set forth and coöperating with the top construction to provide a completely convertible vehicle body.

In the accompanying drawings which form a part of this specification and which show one preferred embodiment of the invention as illustrative of the principle thereof, and the best mode now known to me for performing the same, Figure 1 is a top plan view of a preferred form of vehicle body, with the deck covers closed to form a roadster;

Fig. 2 is a similar view with the deck covers folded into inoperative position to provide accommodations for additional passengers.

Figure 3:
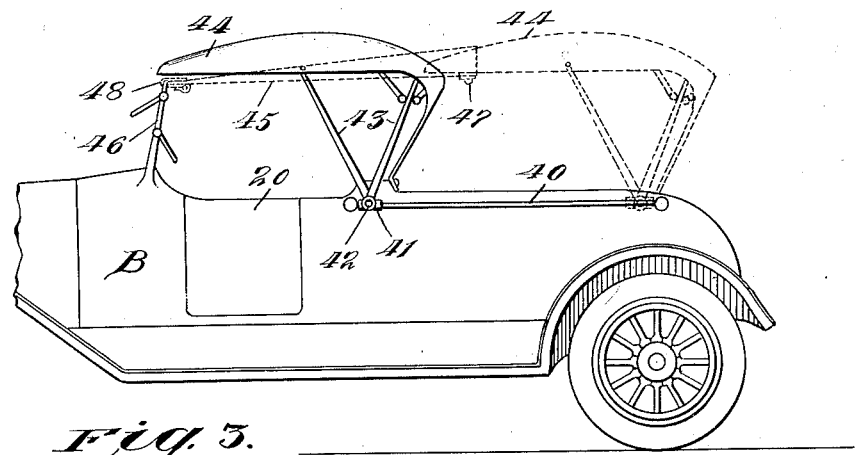
Fig. 3 is a side elevation of the rear portion of the vehicle, showing a top adapted for use with the same.

The drawings show a vehicle body which can be at will converted into a two or three passenger roadster or five passenger touring car. The reference character B designates the body of the vehicle which is provided with fore doors 20 only. The front seat 21 is divided into two sections 21ᵃ which are separate and laterally spaced apart by an aisle 22 which extends between the same, the said aisle forming a passageway to and from the rear seat 23 when that is being used. The rear seat 23 is divided into three sections, the central section 24 being adapted to be moved forwardly between the two sections 21ᵃ of the front seat in order to accommodate a third person when the vehicle is being used as a roadster. Any suitable means may be employed for adapting the section 24 of the rear seat to be moved forward, the means shown comprising rollers 6 which pass through slots 7 in the bottom of the vehicle body and engage tracks 8 secured to the underside of the bottom of the body, slotted plates 8ᵃ being provided for preventing the rollers from being withdrawn from engagement with the tracks 8.

Figure 4:
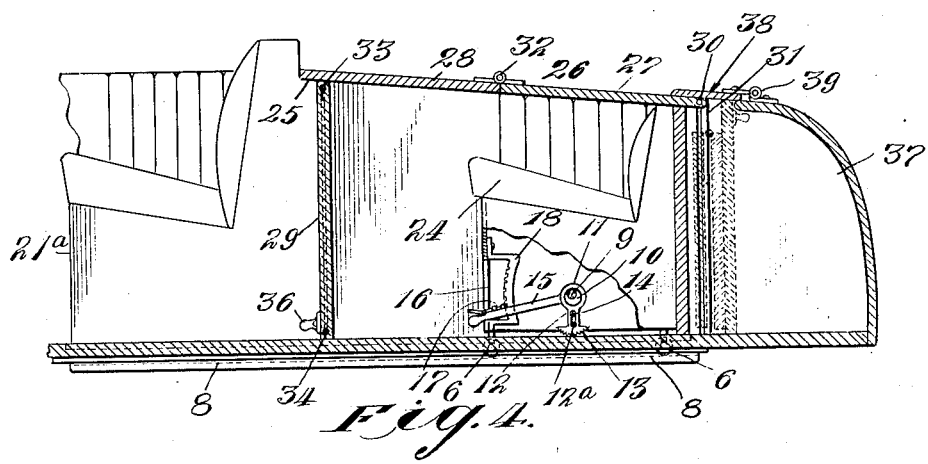
Fig. 4 is a vertical longitudinal sectional view through the rear portion of the body, drawn on an enlarged scale.

Numerous constructions can be utilized for locking the rear seat section 24 in any of the positions into which it is designed to be moved, although only one possible arrangement is shown on the drawings, this being sufficient for illustrating the principles of the invention. Referring to Fig. 4 of the drawing, the reference character 9 designates a horizontally disposed rock shaft which extends transversely across the seat section 24, the ends thereof being journaled in the sides of the said seat section. An eccentric cam 10 is rigidly secured to said rock shaft 9 near each of its ends, said cams being surrounded by eccentric straps 11 which are rigid with the upper ends of vertically disposed clamping dogs 12, the lower ends of which are of an arcuate formation and serrated at 13. Pins 14 project inwardly from the sides of the seat section 5 and engage slots 12ᵃ in the clamping dogs 12 so that the said clamping dogs may have both a sliding and a rotary movement on said pins 14. A lever 15 is rigidly applied to the rock shaft 9 at an intermediate point in the length thereof, said lever projecting through a slot 16 in the front of the seat section, and the outer end of said lever being provided with a conventional latch 17 adapted to engage notches in a segmental locking plate 18 secured to the inner side of the front of the seat section so as to lock the lever in either its upper or lower position. The rock shaft 9 is adapted to be rotated by oscillation of the lever 15, and as the shaft rotates the cams 10 cause a vertical movement of the clamping dogs 12. When the lever and rock shaft are in the position indicated by Fig. 4, the cams 10 force the clamping dogs downwardly so that the serrated lower ends thereof bite into the slotted plates 8ª which are arranged directly beneath them, and when in this position the clamping dogs 12 prevent any movement of the seat section 24 longitudinally of the vehicle body and also prevent shaking or rattling thereof, since the clamping action causes the slotted plates 8ª to be tightly clamped between the rollers 6 on the seat section and the clamping dogs 12. In effect, the seat section is rigidly clamped to the plates 8ª. When the lever 15 is raised upwardly to the limit of its movement the clamping dogs are raised by the cams 10 so as to clear the plates 8ª, thus allowing the seat section to be easily moved.

Figure 5:
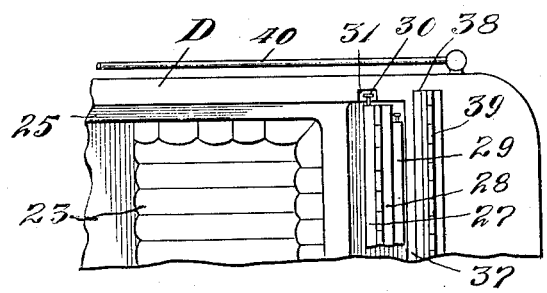
Fig. 5 is a fragmentary top plan view on the same scale as that of Fig. 4, showing the deck covers folded into inoperative position.

To the rear of the front seat 21 and surrounding the rear seat 23 is a deck D, the said deck being rabbeted at 25 to provide a snug fit for the deck cover 26 which is adapted to inclose the rear seat and foot space when it is desired to convert the body into a roadster. The deck cover 26 is formed in three sections 27, 28 and 29, which are hingedly connected, the rear edge of the rear section 27 being also provided with pivot studs 30 which are slidably mounted in vertically disposed guides 31 which are arranged on opposite sides of the body and to the rear of the rear seat 23. The forward edge of the rear section 27 is hingedly connected at 32 to the rear edge of the intermediate section 28, the forward edge of which is pivotally connected at 33 to the front section 29. The sections 27 and 28 when in an operative position, as indicated by Figs. 1 and 4, are adapted to completely cover the top of the rear seat 23, the side edges thereof engaging the rabbeted portions 25 of the deck D, while the forward edge of the section 28 fits snugly against the back of the front seat 21. The section 29 when in an operative position is vertically disposed and fits snugly against the back of the front seat and extends across the aisle 22 so as to completely close the rear seat space of the body. The free edge of the section 29 is provided with pivot studs 34 which engage guide grooves 35 in the side of the body to prevent swinging of the section. When it is desired to throw the deck cover 26 into inoperative position to convert the body into a touring car, the section 29 is pushed upwardly by means of a handle 36 and the pivot studs 34 completely removed from the guide grooves 35. The section 28 is then folded back upon the section 27 and the section 29 folded against the section 28. The section 27 is then raised into a vertical position and allowed to fall downwardly with the pivot studs 30 thereof sliding downwardly in the guides 31 into the space 37 at the rear of the rear seat 23. When in an inoperative position the deck cover 26 will appear as shown by dotted lines on Fig. 4, and solid lines on Fig. 5. A flap or supplemental cover 38 is hinged at 39 to the deck D and is adapted to extend over the opening in the deck which is provided for the cover when it is in an inoperative position, and to form a neat appearance when the deck cover is in an operative position. With this construction the vehicle body can be readily adapted for use either as a touring car, or a roadster, and the movable section 24 of the rear seat 23 provides accommodation for a third person when the vehicle is being used as a roadster.

The novel top construction embodied in the present invention provides a single type of top of a size sufficient to cover one seat. The top is movably mounted on the vehicle body so that it may be located over the front seat when the vehicle is used as a roadster, or over the rear seat when the vehicle is used as a two-seated car or touring car. With a convertible body construction such as described it is not usually desirable to utilize a top which will at all times when in a raised position cover both the front seat and the rear seat, since when the vehicle is being used as a roadster a portion of the top would be wholly useless, and the top extending over the deck would present an inartistic appearance. It is also usatisfactory to have simply a single fixed top over the front seat such as is utilized at present in many roadsters having folding rumble seats, as such a construction provides no protection for the occupants of the extra seats, and furthermore the top obstructs the view of such occupants. In accordance with my invention I provide a top which will cover only the front seat when the vehicle is adapted as a roadster, but which can be moved rearwardly to cover the rear seat when the vehicle is adapted as a two seated car. In the particular construction illustrated for this purpose, a longitudinally extending rod 40 is rigidly secured to each side of the vehicle body and extends between the front and rear seats. A sleeve 41 is slidably mounted upon each of said rods 40, each of said sleeves being adapted to be clamped in adjusted positions thereon by means of thumb screws 42. The bows 43 of a top 44 of any suitable construction are secured to the said sleeves 41, and with this construction it will be obvious that the top can be secured in the position indicated by solid lines on Fig. 3 to cover the front seat, or can be bodily moved rearwardly on the rods 40 into the position indicated by dotted lines to cover the rear seat. When the top is in the last mentioned position, a curtain 45 shown by dotted lines on Fig. 3, can be extended over the front seat between the front of the top 44 and the wind shield 46, the said curtain having any suitable detachable connection 47 with the top 44 and connection 48 with the wind shield 46.

I have not in this case claimed broadly the construction involving the use of a movable seat section, as this forms the subject matter of my Patent No. 1,306,498, dated June 10, 1919, of which this case is a division.

While one preferable embodiment of the invention is illustrated to show the application of the principles of my invention, I do not wish to be limited thereto, since the invention is susceptible of numerous modifications, and it is my desire to cover broadly the invention in whatever form its principle may be embodied.

Having thus described my invention, I claim:—

1. A vehicle body provided with front and rear compartments and having side entrances communicating with said front compartment, seats within said compartments, and a top mounted for sliding movement in rear of said side entrances and adapted to be arranged over either one of said compartments.

2. A vehicle body provided with front and rear compartments and having side entrances communicating with said front compartment, seats within said compartments, guides extending longitudinally along the side walls of the vehicle body in rear of said side entrances, and a top slidingly supported upon said guides and adapted to be arranged over either of said compartments.

3. A vehicle body provided with front and rear compartments, seats within said compartments, a top movably mounted upon the side walls of the vehicle body and adapted to be arranged over either compartment, and means serving as a closure for said rear compartment when said top is arranged over said front compartment.

4. A vehicle body provided with front and rear compartments, seats fixed within said compartments, a top mounted for bodily movement longitudinally of said vehicle and adapted to be arranged over either compartment thereof, and means serving as a closure for said rear compartment when said top is arranged over said front compartment.

5. A vehicle body provided with front and rear compartments, seats fixed within said compartments, a top mounted for sliding movement longitudinally of said vehicle and adapted to be arranged over either compartment thereof, and means serving as a closure for said rear compartment, when said top is arranged over said front compartment.

EDMUND QUINCY MOSES.